United States Patent [19]
Hirata

[11] Patent Number: 5,771,826
[45] Date of Patent: Jun. 30, 1998

[54] MEMORY CARD STORING EMBROIDERY DATA AND EMBROIDERY SEWING DEVICE FOR USE WITH MEMORY CARD

[75] Inventor: Takashi Hirata, Nagoya, Japan

[73] Assignee: Brother Kogyo Kabushiki Kaisha, Nagoya, Japan

[21] Appl. No.: 742,836

[22] Filed: Oct. 31, 1996

[30] Foreign Application Priority Data

Nov. 6, 1995 [JP] Japan .................................. 7-311579

[51] Int. Cl.⁶ .............................. D05B 21/00; D05C 5/04
[52] U.S. Cl. ................... 112/102.5; 112/445; 112/475.19
[58] Field of Search ........................... 112/102.5, 470.06, 112/103, 445, 456, 458, 453, 454, 470.01, 475.19

[56] References Cited

U.S. PATENT DOCUMENTS

| | | | |
|---|---|---|---|
| 4,422,394 | 12/1983 | Bergvall | 112/445 |
| 4,548,142 | 10/1985 | Peck | 112/102.5 |
| 4,870,916 | 10/1989 | Kozawa et al. | 112/445 X |
| 4,881,478 | 11/1989 | Sano | 112/445 X |
| 5,386,789 | 2/1995 | Futamura et al. | 112/102.5 |

*Primary Examiner*—Peter Nerbun
*Attorney, Agent, or Firm*—Oliff & Berridge, PLC

[57] ABSTRACT

An embroidery sewing memory card including a first storage region storing sets of pattern data under corresponding lead addresses, each set of pattern data corresponding to an embroidery pattern and usable in at least one of a plurality of embroidery sewing machine types; and a second storage region storing data in table form indicating correspondence between the embroidery sewing machine types and the lead addresses of pattern data based on which pattern data is usable in which embroidery sewing machine type.

14 Claims, 9 Drawing Sheets

| Address | Content | |
|---|---|---|
| A0000 | LEAD ADDRESS TABLE FOR SMALL DEVICES | LEAD ADDRESS TABLE |
| B0000 | LEAD ADDRESS TABLE FOR LARGE DEVICES | |
| C0000 | LEAD ADDRESS FOR PATTERN DISPLAY DATA OF FIRST EMBROIDERY PATTERN | |
|  | LEAD ADDRESS FOR EMBROIDERY DATA OF FIRST EMBROIDERY PATTERN | |
| C0100 | LEAD ADDRESS FOR PATTERN DISPLAY DATA OF SECOND EMBROIDERY PATTERN | |
|  | LEAD ADDRESS FOR EMBROIDERY DATA OF SECOND EMBROIDERY PATTERN | |
| C0200 | LEAD ADDRESS FOR PATTERN DISPLAY DATA OF THIRD EMBROIDERY PATTERN | |
|  | LEAD ADDRESS FOR EMBROIDERY DATA OF THIRD EMBROIDERY PATTERN | |
| C0300 | ⋮ | |
| C1400 | LEAD ADDRESS FOR PATTERN DISPLAY DATA OF FIFTEENTH EMBROIDERY PATTERN | |
|  | LEAD ADDRESS FOR EMBROIDERY DATA OF FIFTEENTH EMBROIDERY PATTERN | |
| D0000 | PATTERN DISPLAY DATA FOR FIRST EMBROIDERY PATTERN | PATTERN DATA |
|  | PATTERN DISPLAY DATA FOR SECOND EMBROIDERY PATTERN | |
|  | PATTERN DISPLAY DATA FOR THIRD EMBROIDERY PATTERN | |
|  | ⋮ | |
|  | PATTERN DISPLAY DATA FOR FIFTEENTH EMBROIDERY PATTERN | |
| E0000 | EMBROIDERY DATA FOR FIRST EMBROIDERY PATTERN | |
|  | EMBROIDERY DATA FOR SECOND EMBROIDERY PATTERN | |
|  | EMBROIDERY DATA FOR THIRD EMBROIDERY PATTERN | |
|  | ⋮ | |
|  | EMBROIDERY DATA FOR FIFTEENTH EMBROIDERY PATTERN | |

FIG. 4

```
                                                              23
A0000 ┌─────────────────────────────────────────────┬────────┐ ⎫
      │ LEAD ADDRESS FOR PATTERN DISPLAY DATA OF    │(C0000) │ │
      │        FIRST EMBROIDERY PATTERN             │        │ │
      ├─────────────────────────────────────────────┼────────┤ │
      │ LEAD ADDRESS FOR PATTERN DISPLAY DATA OF    │(C0100) │ │
      │        SECOND EMBROIDERY PATTERN            │        │ │
      ├─────────────────────────────────────────────┼────────┤ │
      │ LEAD ADDRESS FOR PATTERN DISPLAY DATA OF    │(C0200) │ │
      │        THIRD EMBROIDERY PATTERN             │        │ ⎬ LEAD ADDRESS
      │                    ⋮                         │        │ │ TABLE FOR
      │                                             │        │ │ SMALL DEVICE
      ├─────────────────────────────────────────────┼────────┤ │
      │ LEAD ADDRESS FOR PATTERN DISPLAY DATA OF    │(C0900) │ │
B0000 │        TENTH EMBROIDERY PATTERN             │        │ ⎭
      ├─────────────────────────────────────────────┼────────┤ ⎫
      │ LEAD ADDRESS FOR PATTERN DISPLAY DATA OF    │(C0000) │ │
      │        FIRST EMBROIDERY PATTERN             │        │ │
      ├─────────────────────────────────────────────┼────────┤ │
      │ LEAD ADDRESS FOR PATTERN DISPLAY DATA OF    │(C0100) │ │
      │        SECOND EMBROIDERY PATTERN            │        │ │
      ├─────────────────────────────────────────────┼────────┤ │
      │ LEAD ADDRESS FOR PATTERN DISPLAY DATA OF    │(C0200) │ │
      │        THIRD EMBROIDERY PATTERN             │        │ ⎬ LEAD ADDRESS
      │                    ⋮                         │        │ │ TABLE FOR
      │                                             │        │ │ LARGE DEVICE
      ├─────────────────────────────────────────────┼────────┤ │
      │ LEAD ADDRESS FOR PATTERN DISPLAY DATA OF    │(C1400) │ │
      │        FIFTEENTH EMBROIDERY PATTERN         │        │ │
C0000 └─────────────────────────────────────────────┴────────┘ ⎭
```

| Address | Content | Section |
|---|---|---|
| A0000 | SMALL DEVICE NUMBER OF PATTERNS TABLE [NUMBER OF EMBROIDERY PATTERNS : 10] | NUMBER OF PATTERNS TABLES |
| B0000 | LARGE DEVICE NUMBER OF PATTERNS TABLE [NUMBER OF EMBROIDERY PATTERNS : 15] | |
| C0000 | LEAD ADDRESS FOR PATTERN DISPLAY DATA OF FIRST EMBROIDERY PATTERN | LEAD ADDRESS TABLE |
| | LEAD ADDRESS FOR EMBROIDERY DATA OF FIRST EMBROIDERY PATTERN | |
| C0100 | LEAD ADDRESS FOR PATTERN DISPLAY DATA OF SECOND EMBROIDERY PATTERN | |
| | LEAD ADDRESS FOR EMBROIDERY DATA OF SECOND EMBROIDERY PATTERN | |
| C0200 | LEAD ADDRESS FOR PATTERN DISPLAY DATA OF THIRD EMBROIDERY PATTERN | |
| | LEAD ADDRESS FOR EMBROIDERY DATA OF THIRD EMBROIDERY PATTERN | |
| C0300 | ⋮ | |
| C1400 | LEAD ADDRESS FOR PATTERN DISPLAY DATA OF FIFTEENTH EMBROIDERY PATTERN | |
| | LEAD ADDRESS FOR EMBROIDERY DATA OF FIFTEENTH EMBROIDERY PATTERN | |
| D0000 | PATTERN DISPLAY DATA FOR FIRST EMBROIDERY PATTERN | PATTERN DATA |
| | PATTERN DISPLAY DATA FOR SECOND EMBROIDERY PATTERN | |
| | PATTERN DISPLAY DATA FOR THIRD EMBROIDERY PATTERN | |
| | ⋮ | |
| | PATTERN DISPLAY DATA FOR FIFTEENTH EMBROIDERY PATTERN | |
| E0000 | EMBROIDERY DATA FOR FIRST EMBROIDERY PATTERN | |
| | EMBROIDERY DATA FOR SECOND EMBROIDERY PATTERN | |
| | EMBROIDERY DATA FOR THIRD EMBROIDERY PATTERN | |
| | ⋮ | |
| | EMBROIDERY DATA FOR FIFTEENTH EMBROIDERY PATTERN | |

MEMORY CARD STORING EMBROIDERY DATA AND EMBROIDERY SEWING DEVICE FOR USE WITH MEMORY CARD

BACKGROUND OF THE INVENTION

1. Field of the Invention

The present invention relates to an embroidery sewing memory card, to a method of storing data in the memory card, to a sewing data processor capable of displaying embroidery patterns, and to an embroidery sewing device.

2. Description of the Related Art

There has been known a type of embroidery sewing device, such as an electrically controlled sewing machine capable of sewing embroidery and attached to an embroidery device. A control unit of the sewing machine is provided with a non-volatile memory storing pattern data for sewing a plurality of different types of embroidery patterns, such as character patterns, many one point patterns, a variety of ornamental sewing patterns, and also a plurality of practical stitch patterns. The sewing machine also includes a display unit having a large liquid crystal display. By displaying the plurality of embroidery patterns on the display unit, a user can select a desired embroidery pattern by manipulating a type selection key to select a desired one from the displayed embroidery patterns.

The non-volatile memory provided to the sewing machine can only store a limited amount of embroidery data for a plurality of embroidery patterns. To enable the sewing machine to sew embroidery patterns other than those stored in the non-volatile memory, recently, embroidery sewing memory cards such as card ROMs have been provided for storing pattern data for embroidery patterns. Sewing machines have been provided with mounting portions for freely detachably mounting these memory cards. A user selectively mounts a memory card storing embroidery data for a desired embroidery pattern into the mounting portion. This configuration increases the number of embroidery patterns that a user can sew using his or her sewing machine.

However, not all electrically controlled sewing machines capable of sewing embroidery can embroider the same sized embroidery patterns. That is, a plurality of sewing machine types are available with different sized embroidery regions where the embroidery patterns are sewn. Therefore, sewing machine manufacturers produce and sell special memory cards for each type of sewing machine. Each memory card stores embroidery data for embroidery patterns sewable by the corresponding sewing machine. Users purchase the memory cards corresponding to the type of sewing machine they possess. They can sew embroidery by selecting a desired embroidery pattern from a plurality of embroidery patterns stored in the memory cards.

SUMMARY OF THE INVENTION

As described above, for each type of sewing machine capable of sewing embroidery, pattern data for embroidery patterns that the type of sewing machine can sew are stored in a special embroidery sewing memory card. A plurality of types of memory cards are sold. This increases the number of embroidery patterns that a user can sew using his or her sewing machine. However, it is troublesome to produce a plurality of types of memory cards storing embroidery pattern data that differs for each sewing machine type. Further, it is complicated to manage the many memory cards produced for all the different types of sewing machines. It is complicated to manage, by sewing machine type, patterns to be stored on memory cards.

Manufacturers of memory cards could reduce the number of types of memory cards by storing, in each card, pattern data for a plurality of embroidery patterns that can be sewn by a plurality of different sewing machine types. However, in this case, large embroidery patterns that can be sewn only by those sewing machine with a large embroidery region will also be displayed as selectable on the display of sewing machines capable of sewing only small embroidery patterns. A user will waste time and may become frustrated by trying to select an embroidery pattern which his sewing machine can not sew.

It is an objective of the present invention to overcome the above-described problems and to provide a memory card, a method of storing data in the memory card, a sewing data processor capable of displaying embroidery patterns, and an embroidery sewing device wherein the pattern data of embroidery patterns and stored in an embroidery sewing memory card are grouped by common applicable sewing machine type and also wherein pattern data for group of embroidery patterns that can be sewn by a corresponding sewing machine type can be selectively retrieved from the memory card.

In order to achieve the above-described objectives, an embroidery sewing memory card according to the present invention is detachably mountable in a memory card mounting portion of an embroidery sewing machine, and includes a first storage region storing sets of pattern data under corresponding lead addresses, each set of pattern data corresponding to an embroidery pattern and usable in at least one of a plurality of embroidery sewing machine types; and a second storage region storing data in table form indicating correspondence between the embroidery sewing machine types and the lead addresses of pattern data based on which pattern data is usable in which embroidery sewing machine type.

A method of storing embroidery data according to the present invention incised the steps of: a first step of storing sets of pattern data under corresponding lead addresses in a first storage region, each set of pattern data corresponding to an embroidery pattern and usable in at least one of a plurality of embroidery sewing machine types; and a second step of storing, in a second storage region, data in table form indicating correspondence between the embroidery sewing machine types and the lead addresses of pattern data based on which pattern data is usable in which embroidery sewing machine type.

An embroidery data processor according to the present invention includes: embroidery sewing memory card including a first storage region storing sets of pattern data under corresponding lead addresses, each set of pattern data corresponding to an embroidery pattern and usable in at least one of a plurality of embroidery sewing machine types; and a second storage region storing data in table form indicating correspondence between the embroidery sewing machine types and the lead addresses of pattern data based on which pattern data is usable in which embroidery sewing machine type; a memory card mounting portion for detachably mounting the memory card; display means including a display and a controller; and pattern display control means for storing information indicating at least one of the plurality of sewing machine types applicable to the data processor and for displaying on the display means each embroidery pattern sewable by the indicated at least one sewing machine.

When the present invention is applied to a memory card mountable to an embroidery sewing device, then by retrieving the lead addresses from the lead address table corresponding to the embroidery sewing device type based on information from the embroidery sewing device, then based on the retrieved lead addresses, pattern data relating to each embroidery pattern sewable by the embroidery sewing device can be retrieved from the memory card.

The memory card stores pattern data relating to embroidery patterns grouped by type of embroidery sewing devices to which they are commonly applicable. According to one aspect of the present invention, the memory card also stores a lead address table for each type of embroidery sewing device. According to another aspect of the present invention, the memory card stores a lead address wherein the embroidery patterns are stored in size order, from smallest to largest, and also a plurality of number of patterns tables. By changing the indicated number of patterns table according to the embroidery sewing device type, only pattern data for the number of embroidery patterns sewable by each type of embroidery sewing device can be selectively retrieved from the memory card.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Preferred embodiments of the present invention will be described while referring to the accompanying drawings wherein like parts and components are designated by the same reference numerals to avoid duplicating description.

The present embodiment describes the present invention applied to an embroidery sewing device M including an electrically controlled zigzag sewing machine and a mechanism for feeding a workpiece cloth. The embroidery sewing device M includes: an electrically controlled zigzag sewing machine 1 mounted with a needle 15; and a workpiece cloth feeding mechanism 40 capable of embroidery sewing and detachably mounted to the sewing machine 1.

First, an explanation will be provided for the sewing machine 1. The sewing machine 1 includes a bed portion 10; a column portion 11 provided with an upright posture at the right tip portion of the bed portion 10 as viewed in FIG. 1; and an arm portion 12 extending from the column portion 11 leftward as viewed in FIG. 1 in parallel with the bed portion 10. Although, not shown in the drawings, a feed dog vertical movement mechanism for vertically driving a feed dog and a feed dog horizontal movement mechanism for horizontally driving the feed dog are provided to the bed portion 10.

Figure 2:
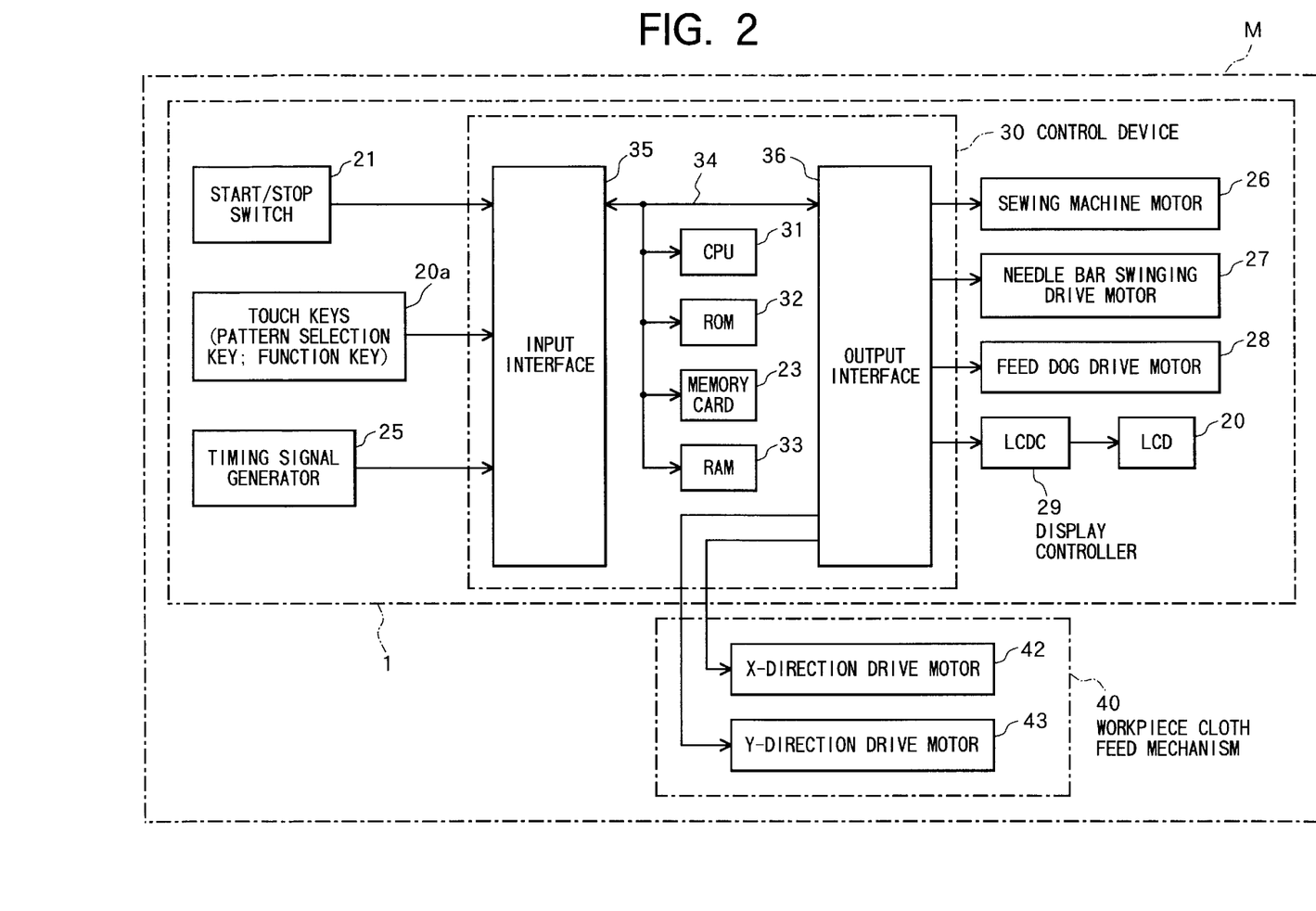
FIG. 2 is a block diagram showing electrical configuration of a control system of the embroidery sewing device of FIG. 1.

Although not shown in the drawings, the arm portion 12 is provided with a needle bar drive mechanism for vertically driving a needle bar 14 with a needle 15 mounted to its lower tip; a needle bar swinging mechanism for swinging the needle bar 14 in a direction perpendicular to the feed direction of the workpiece cloth; and a thread take up lever mechanism for vertically driving a thread take up lever 16 in coordination with vertical drive of the needle bar 14. As shown in FIG. 2, a sewing machine motor 26 is provided for driving the needle bar drive movement mechanism, the lever drive movement mechanism, and the feed dog vertical movement mechanism; a needle bar swing drive motor 27 is provided for driving the needle bar swing mechanism; and a feed dog drive motor 28 is provided for driving the feed dog horizontal movement mechanism. Said differently, a sewing mechanism for driving the needle bar 14 is configured from the needle bar drive movement mechanism, the lever drive movement mechanism, and the like.

Figure 1:
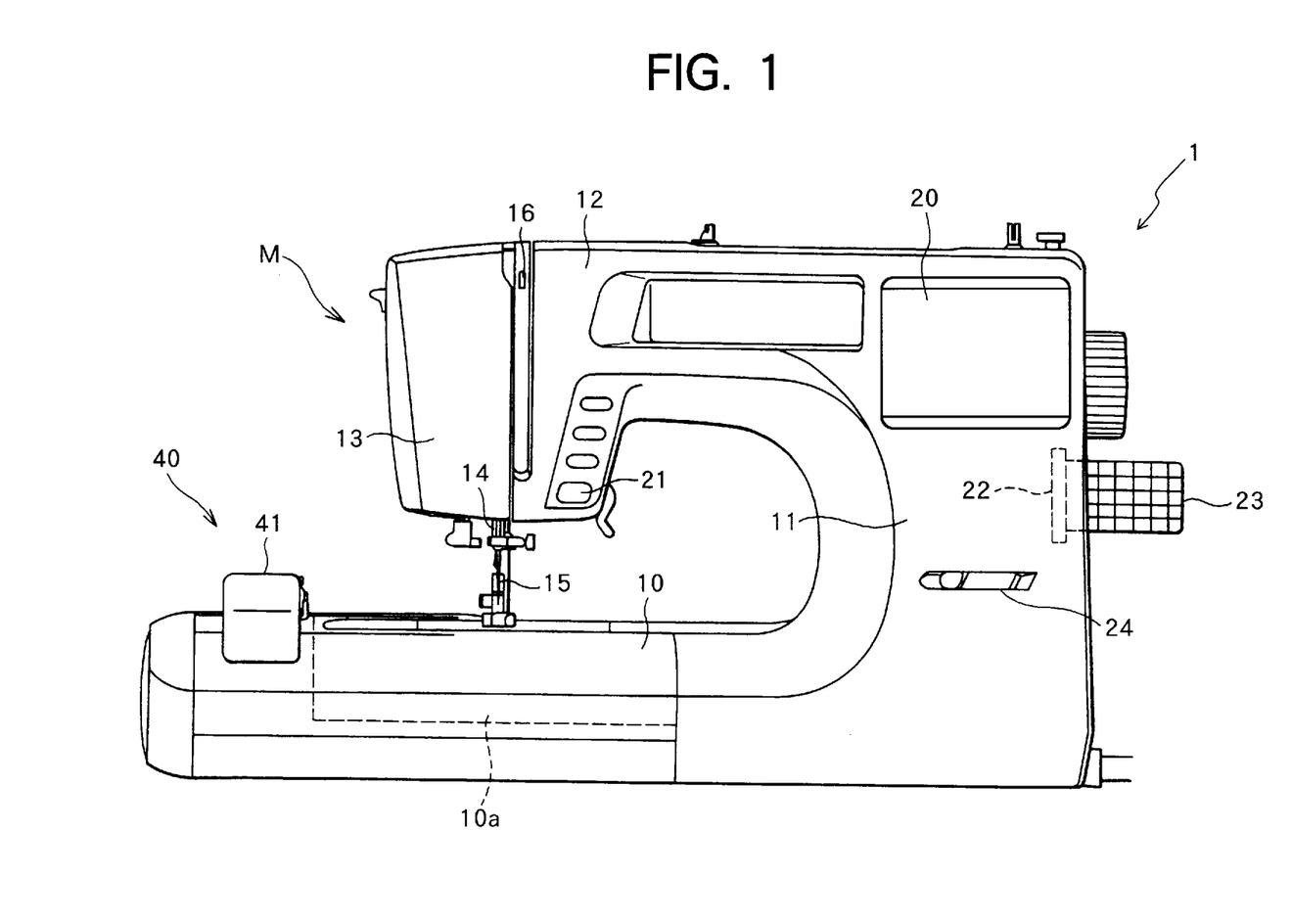
FIG. 1 is a frontal view showing an embroidery sewing device according to a first embodiment of the present invention.

A liquid crystal display 20 capable of displaying a plurality of embroidery patterns and a variety of messages is provided to the front surface of the arm portion 12. A plurality of touch keys 20a formed from transparent electrodes are provided to the display region of display 20. The touch keys 20a serve as pattern selection keys for selecting patterns from embroidery patterns displayed on the display 20 and also serve as functions keys displayed with function names. A start/stop switch 21 for commanding start and stop of sewing operations is provided in the vicinity of a head portion 13 of the arm portion 12. The column portion 11 is provided with a memory card mounting connector 22 for detachably mounting embroidery sewing memory cards 23, which serve as an external memory; and a speed changing knob 24 for adjusting sewing speed.

A free arm portion 10a is formed to the left tip of the head portion 10. The workpiece cloth feed mechanism 40 capable of sewing large embroidery patterns is detachably mounted to the free arm portion 10a.

An embroidery table 41 is provided to the workpiece cloth feed mechanism 40 movable in a Y-direction, which is parallel to the directions in which feed cloth is reciprocally fed, and an X-direction, which is perpendicular to the Y-direction. Although, not shown in the drawings, a cloth support frame for supporting the workpiece cloth can be detachably mounted to the embroidery table 41. An X-direction drive motor 42 for driving the embroidery table 41 in the X-direction and a Y-direction drive motor 43 for driving the embroidery table 41 in the Y-direction are provided within the main frame of the workpiece cloth feed mechanism 40. The sewing mechanism and the workpiece cloth feed mechanism 40 comprise an embroidery sewing means.

Next, an explanation of essential components of a control system for the sewing machine 1 and the workpiece cloth feed mechanism 40 will be described while referring to the block drawing in FIG. 2.

The control device 30 of the sewing machine 1 includes a microcomputer, an input interface 35, and an output interface 36. The microcomputer includes a CPU 31, a ROM 32, a memory card 23, and a RAM 33. The input interface 35 and the output interface 36 are connected to the microcomputer via a bus 34, such as a data bus. Signals from the start/stop switch 21, the touch key 20a, and a timing signal generator 24 are supplied to the microcomputer through the input interface 35. Drive signals and drive pulse signals for driving the machine motor 26, the needle bar swing drive motor 27, the feed dog drive motor 28, and a display controller (LCDC) 29, which is for supplying display signals to the display 20, are supplied from the microcomputer through the output interface 36.

A timing signal generator 25 is connected to the upper shaft of the sewing machine 1 to detect rotational phase of the upper shaft.

The output interface 26 is connected to the X-direction drive motor 42 and the Y-direction drive motor 43 of the workpiece cloth feed mechanism 40. The drive motors 42, 43 are independently driven based on separate drive signals outputted from the control unit 30 to move the embroidery table 41 to a particular position for each stitch using a combination of movements in the X and Y directions, thereby enabling sewing of a variety of embroidery patterns in the workpiece cloth supported in the cloth support frame.

Next, an explanation will be provided for the memory card 23 and a method of storing data in the memory card 23.

Figure 3:
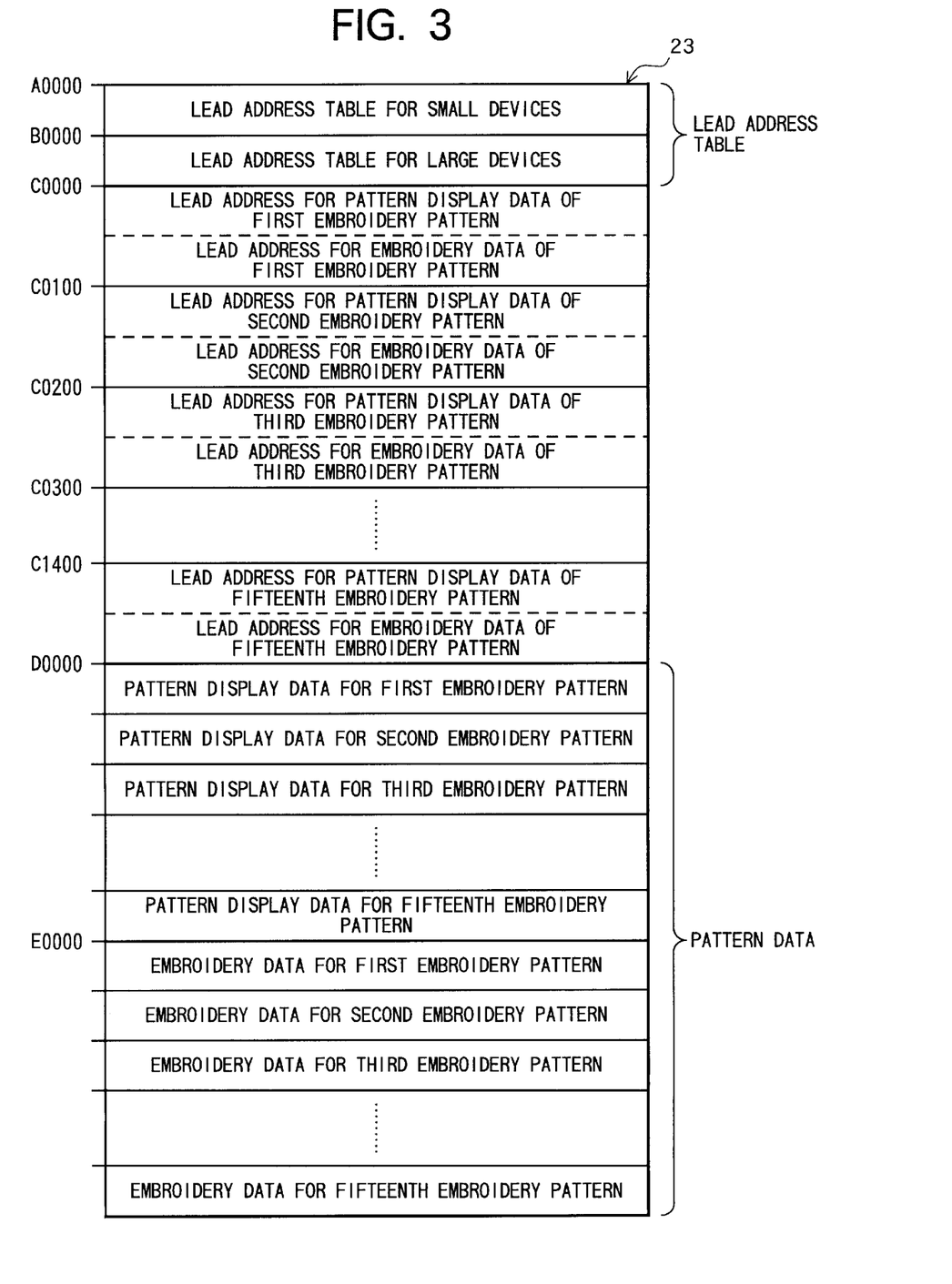
FIG. 3 is a schematic view showing storage areas of a memory card used in the embroidery sewing device.

As shown in FIG. 3, the memory card 23 has stored therein pattern data including embroidery data for sewing a variety of embroidery patterns using the sewing mechanism, such as that of the embroidery sewing device M, and pattern display data for displaying the variety of embroidery patterns on the display 20. The variety of embroidery patterns includes five animal embroidery patterns, such as a panda pattern, an elephant pattern, and a horse pattern; five vehicle embroidery patterns such as a three-wheeled vehicle pattern, bus pattern, and ship pattern; and five flower embroidery patterns.

For each pattern, the two lead addresses indicating the storage area for the embroidery data and pattern display data of the corresponding pattern data are stored together under a common lead address. In the example shown in FIG. 3, the lead addresses for both embroidery data and pattern display data of the first embroidery pattern, which is the panda pattern, are stored under a lead address of C0000. Next, the lead addresses for the embroidery data and the pattern display data of the second embroidery pattern, which is the elephant pattern, are stored under a lead address of C0100. Next, the lead addresses for the embroidery data and the pattern display data of the third embroidery pattern, which is horse pattern, is stored under a lead address of C0200. Lead addresses for all of the sets of pattern data described above are stored serially in this manner until the lead addresses for the embroidery data and the pattern display data of the fifteenth embroidery pattern, which is the final floral pattern, is stored under a lead address of C1400.

Pattern display data for the first embroidery pattern is stored with a lead address of D0000. In the same manner, pattern display data for the second through fifteenth embroidery patterns are serially stored. Also, embroidery data for the first embroidery pattern is stored with a lead address of E0000. Then, in the same manner, embroidery data for the second through fifteenth embroidery patterns are serially stored. As mentioned above, the pattern data for the above-described embroidery patterns includes the embroidery data and the pattern display data.

The memory card 23 also stores from an address A0000 a small sewing machine lead address table storing lead addresses of pattern data for small embroidery patterns. The memory card 23 also stores from an address B0000 a large sewing machine type lead address table storing lead addresses of pattern data for large embroidery patterns. The small sewing machine lead address table lists in table form, by sewing machine type, lead addresses of pattern data for each of a plurality of embroidery patterns sewable by small type embroidery sewing devices MS having a small embroidery region, such as the device shown in FIG. 6. Similarly, the large sewing machine type lead address table lists lead addresses of pattern data for each of a plurality of embroidery patterns sewable by large type embroidery sewing devices ML having a large embroidery region, such as the device shown in FIG. 7.

Figure 4:
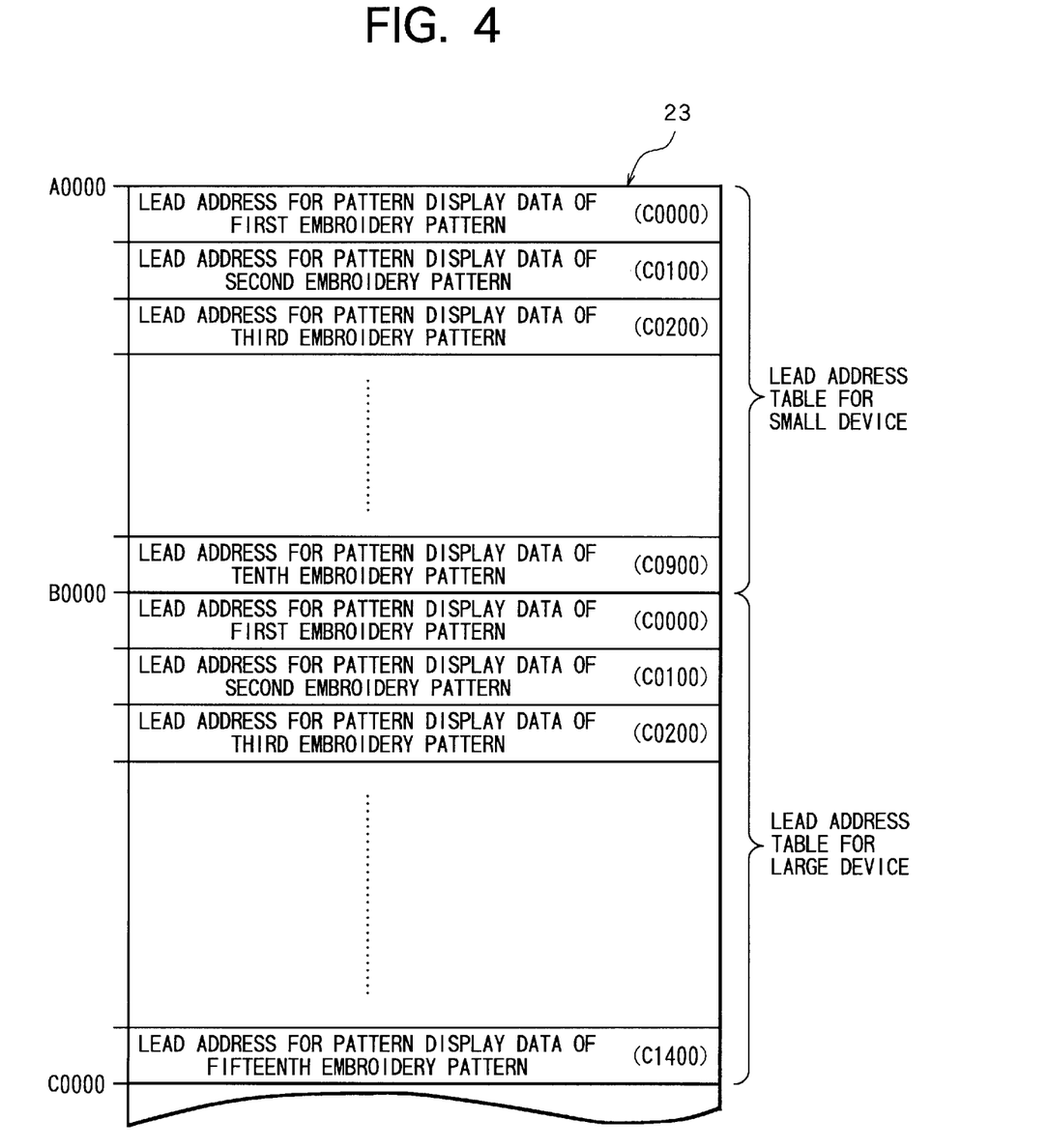
FIG. 4 is a schematic view showing details of a lead address table stored in one of the storage areas of the memory card.
Figure 6:
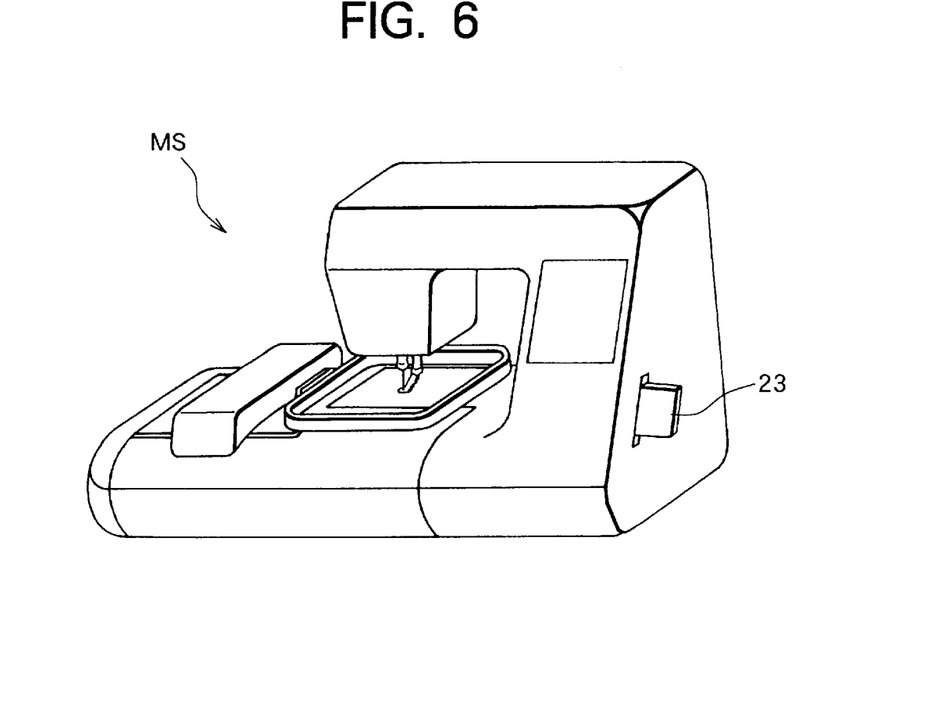
FIG. 6 is a perspective view showing a small type embroidery sewing device.

In the example shown in FIG. 4, lead addresses for pattern data for first through tenth embroidery patterns, which can be sewn using the small type embroidery sewing device MS shown in FIG. 6, are serially stored in the small sewing machine type lead address table stored from address A0000. Also, lead addresses for pattern data of the first through fifteenth embroidery patterns, which can all be sewn using the large type embroidery sewing device ML shown in FIG. 7 and which also include embroidery patterns sewable using the small type sewing device MS, are stored in the large type sewing machine lead address table stored from address B0000.

The ROM 32 stores table indication information, an embroidery sewing control program, and an embroidery pattern display control program. The table indication information includes data to indicate that the present sewing machine is either "small device" or "large device". As a result, of the two lead address tables stored in the embroidery sewing memory card 23, whichever of the small type sewing machine lead address table and the large type sewing machine lead address table corresponds to the type of embroidery sewing device will be referred to during the embroidery pattern display routine. In order to sew embroidery, the embroidery sewing control program controls drive of the drive motors 27, 28 based on embroidery data of practical stitches, such as zigzag stitches and triple stitches and controls drive of the drive motors 42, 43 based on embroidery data. The RAM 33 is provided with a variety of memories such as counters and buffers required to execute control of stitching and control of embroidery pattern display.

Figure 5:
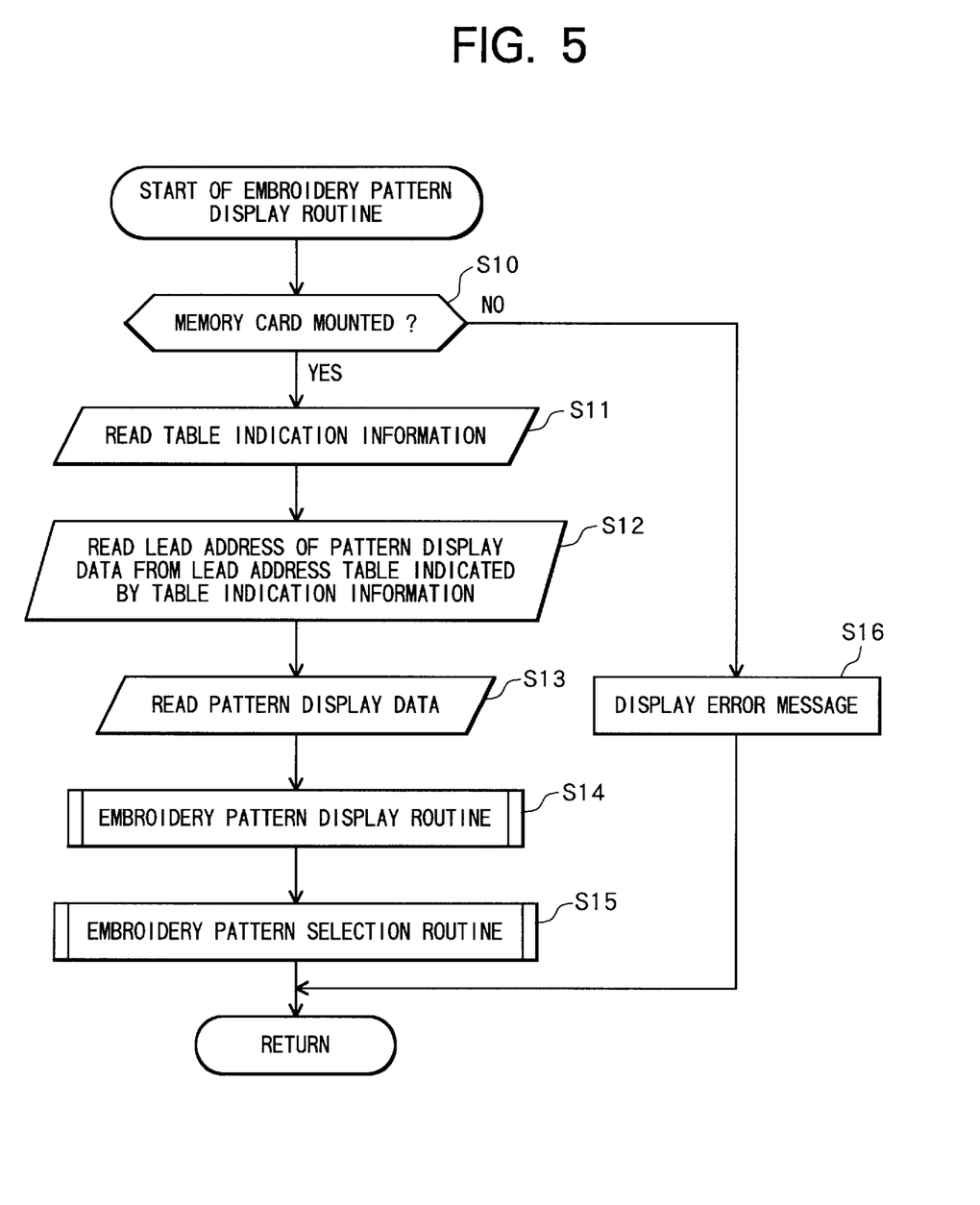
FIG. 5 is a flowchart representing an embroidery pattern display routine.

Next, the embroidery pattern display routine executed by the control device 30 of the sewing machine 1 will be explained while referring to the flowchart shown in FIG. 5. It should be noted that symbols Si (i=10, 11, 12 . . . ) refer to individual steps of the routine.

This routine is started when the power of the sewing machine is turned on and the sewing machine is set to the embroidery sewing mode. It is determined in S10 that the memory card 23 is mounted in the embroidery sewing device M when a connection status detection signal is read from a certain pin of the memory card mounting connector 22. In this case (S10:YES), then the table indication information stored in the ROM 32 is retrieved in S11.

Then, the lead addresses for a plurality of pattern display data are retrieved in S12 from the lead address table indicated by the table indication information retrieved in S11. Further, in S13, pattern display data for displaying those embroidery patterns sewable by the embroidery sewing device M is retrieved based on the lead addresses retrieved in S12. An embroidery pattern display routine for displaying, on the display 20, the pattern display data retrieved in S12 is executed in S14.

Figure 8:
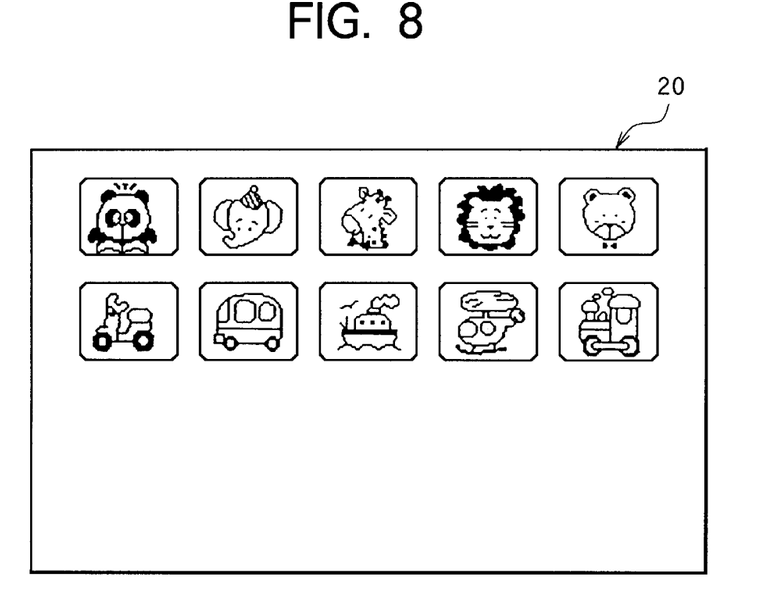
FIG. 8 is a schematic view showing embroidery patterns displayed on a display of the small embroidery sewing device as a result of the embroidery pattern display routine.

For example, the table indication information stored in the ROM 32 of the small sized embroidery sewing device MS shown in FIG. 6 will read "small device", thereby indicating the small sewing machine lead address table stored in the memory card 23. Based on the lead address data of the small device sewing machine lead address table, pattern display data for the first through tenth embroidery patterns stored in the small device lead address table will be retrieved from the memory card 23. As shown in FIG. 8, only the ten embroidery patterns applicable to the small embroidery sewing device MS, that is, that the small embroidery sewing device MS is capable of sewing will be displayed on the display 20.

Figure 7:
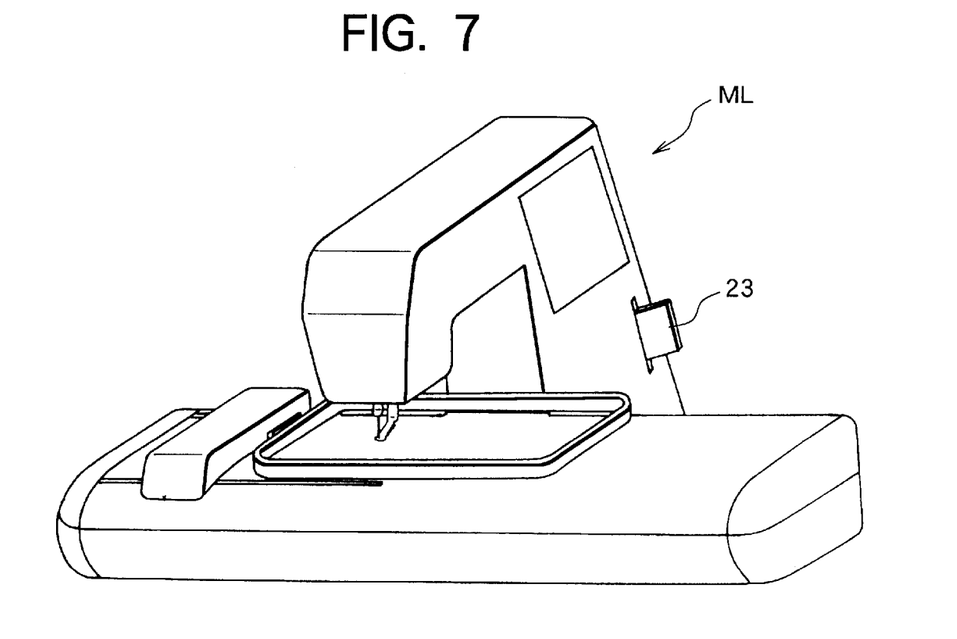
FIG. 7 is a perspective view showing a large type embroidery sewing device.
Figure 9:
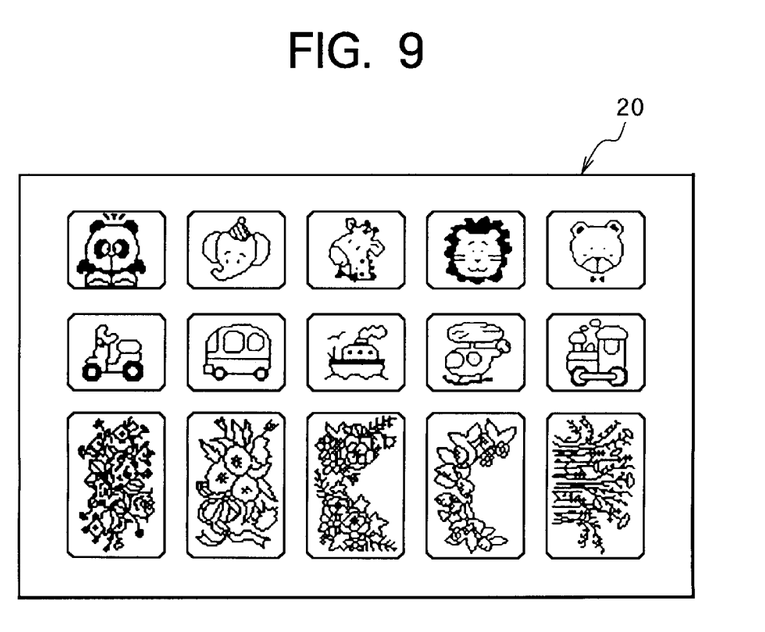
FIG. 9 is a schematic view showing embroidery patterns displayed on a display of the large embroidery sewing device as a result of the embroidery pattern display routine.

On the other hand, the table indication information stored in the ROM 32 of the large type embroidery sewing device ML as shown in FIG. 7 will read "large device", thereby indicating the large sewing machine lead address table stored in the memory card 23. In this case, based on the lead address data of the large sewing machine lead address table stored in the memory card 23, the pattern display data for embroidery patterns one through fifteen, which is stored under both lead addresses listed in the large sewing machine lead address table, are retrieved from the memory card 23. As shown in FIG. 9, all 15 embroidery patterns which the large type embroidery sewing device ML is capable of sewing, including the 10 embroidery patterns which small devices are capable of sewing, are displayed on the display 20.

An embroidery pattern selection routine is then executed in S15. To select one of the plurality of embroidery pattern displayed on the display 20, a user manipulates the touch key 20a corresponding to the embroidery pattern he or she desires the embroidery sewing device M to sew. The CPU 31 detects this selection and retrieves the corresponding embroidery data from the memory card 23. After this selection routine, the program returns to the main routine. Then, the sewing machine motor 26 and the workpiece cloth feed mechanism 40 are driven according to the retrieved embroidery data to sew the selected embroidery pattern. When the memory card 23 is not mounted in the embroidery sewing device M at the start of the embroidery pattern display routine (S10:NO), then an error message is displayed on the display 20 in S16 and the program returns to the main routine.

Next, operations and effects of the embroidery pattern display routine for displaying on the display 20 those embroidery patterns which the embroidery sewing device M are capable of sewing from the memory card 23 mounted in the embroidery sewing device M will be explained.

The memory card 23 stores pattern data, which includes embroidery display data and embroidery data, relating to a plurality of embroidery patterns applicable to one or both of small type and large type embroidery sewing devices. The memory card 23 also stores lead address tables including a small device lead address table and a large device lead address table. Because one type of memory card 23 can be used with a plurality of embroidery sewing devices, its general usability is enhanced and its manufacture can be simplified. Further, the different embroidery patterns stored in the memory card 23 need not be managed separately by type of embroidery device. Also, a plurality of memory cards 23 need not be managed separately for each type of embroidery device.

Because either the large device or small device table indication information, whichever is appropriate for the present embroidery sewing device M, is stored in the ROM 32 of the control device 30, by changing the table indication information according to type of embroidery sewing device, the pattern data for only those embroidery patterns sewable by the corresponding embroidery sewing device M can be selectively retrieved from the memory card 23, to be displayed or sewn as desired.

The present invention can also be applied to an embroidery data processor having the same control device 30 and the display 20 but no sewing mechanism nor workpiece cloth feed mechanism. As in the embroidery sewing device M described above, a control program for controlling display of embroidery patterns is stored in the ROM 32 of the control device 30. Also, a memory card 23 is mountable in the embroidery data processor. The memory card 23 stores pattern data, including pattern display data and embroidery data, relating to a plurality of embroidery patterns applicable to a plurality of types of embroidery sewing mechanisms such as the sewing mechanism and the workpiece cloth support frame described above. The memory card 23 also stores lead address tables indicating the various types of sewing mechanisms. Further, the ROM 32 of the control device 30 stores table indication information indicating which of the sewing devices M are applicable to the embroider data processor. Therefore, this embroidery data processor can achieve the same effects and the operations as the embroidery sewing device described above. Said differently, the embroidery data processor according to the present invention is the same as a sewing machine according to the present invention, but without components needed for sewing operations such as a sewing mechanism or workpiece cloth feed mechanism.

Figure 10:
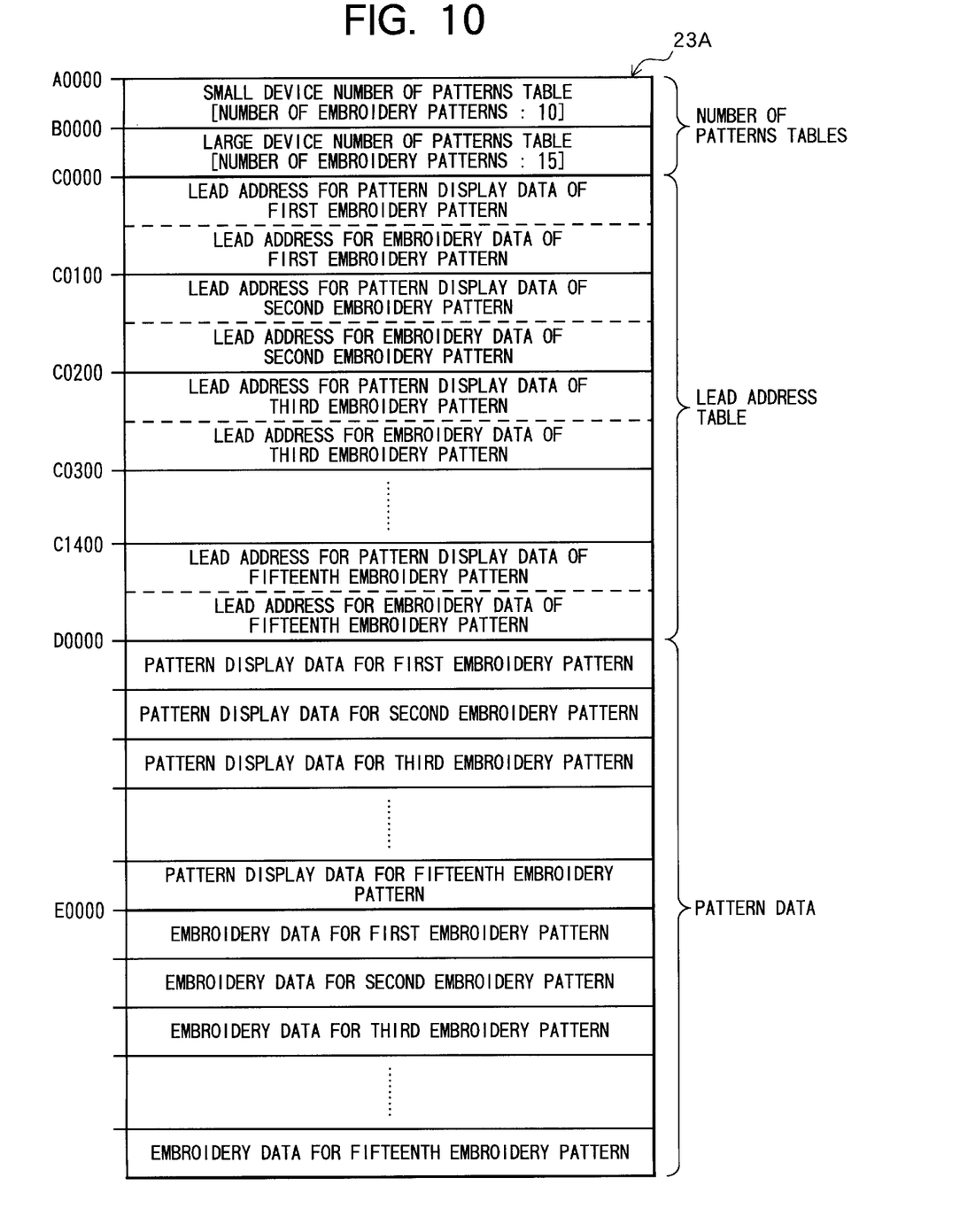
FIG. 10 is a schematic view showing storage areas of a memory card used in an embroidery sewing device according to a second embodiment of the present invention.
Figure 11:
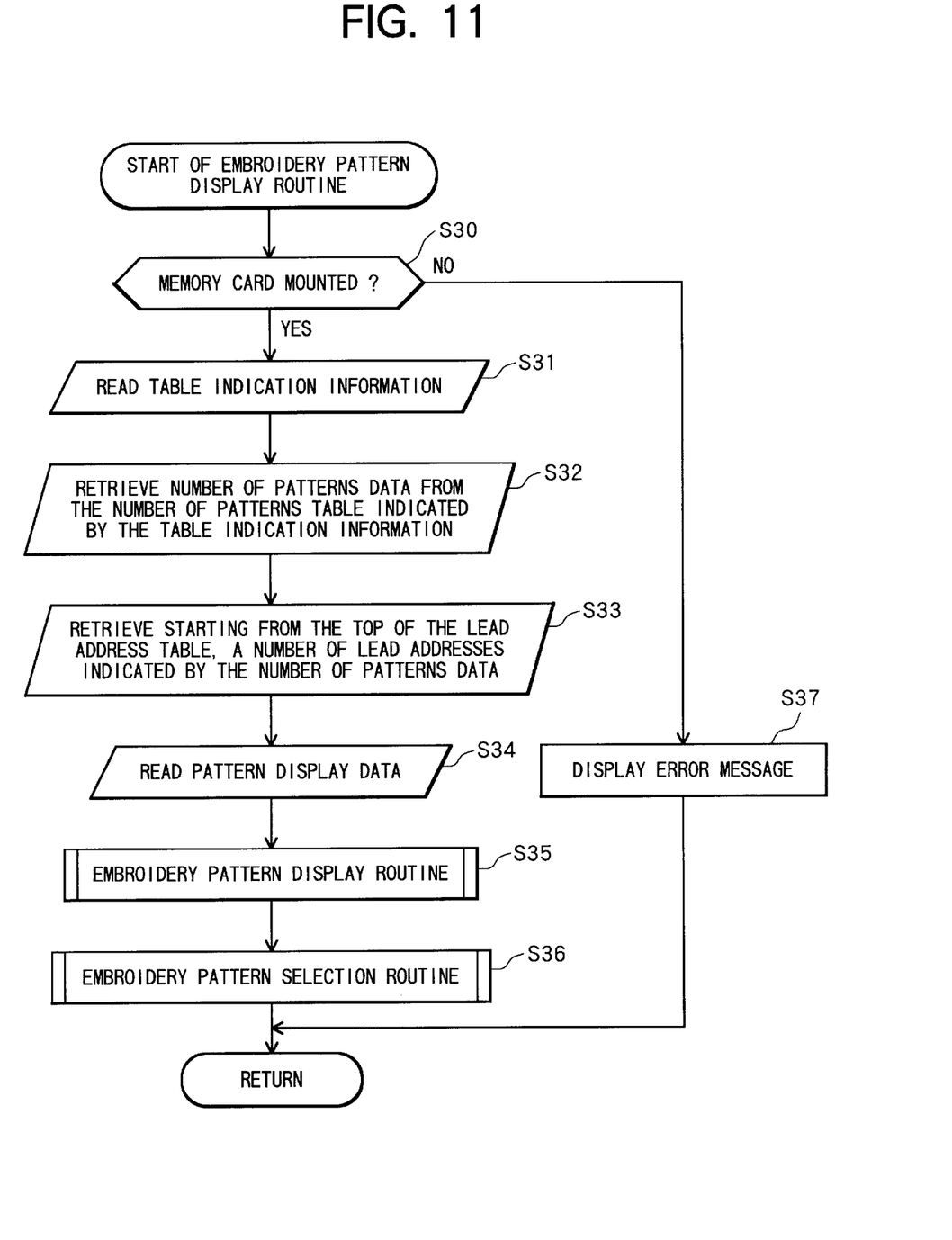
FIG. 11 is a flowchart representing an embroidery pattern display routine according to the second embodiment of the present invention.

A second embodiment of the present invention will be described while referring FIGS. 10 and 11. As shown in FIG. 10, a memory card 23A can store embroidery data relating to a first to fifteenth embroidery patterns; a lead address table storing lead addresses of pattern data arranged by size of corresponding embroidery patterns; and a number of patterns table including a number of embroidery patterns sewable by each of a variety of embroidery sewing devices. On the other hand, the ROM 32 of the control device 30 in the embroidery sewing device M stores table indication information indicating the number of patterns table corresponding to the present embroidery sewing device M and an embroidery pattern display routine for controlling display of the embroidery pattern and represented by the flowchart shown in FIG. 11. The small embroidery sewing device MS stores "small device" as its table indication information and the large embroidery sewing device ML stores "large device" as its table indication information.

As shown in FIG. 10, the memory card 23A stores pattern display data for each embroidery pattern from lead address D0000 and embroidery data for each embroidery pattern from lead address E0000. As a lead address table, the memory card 23A stores the lead addresses of embroidery display data and embroidery data for each embroidery pattern from the lead address C0000. Further, as number of patterns tables, the memory card 23A stores a small device number of patterns table from lead address A0000 and a large device number of patterns table from lead address B0000.

The small device number of patterns table stores the number "10", which represents the number of embroidery patterns sewable by a small embroidery sewing device MS in its small embroidery region. The large device number of patterns table stores the number "15", which represents the number of embroidery patterns sewable by the large embroidery sewing device ML in its large embroidery region. The lead addresses of pattern data are stored categorized by size of the corresponding embroidery pattern in the lead address table. For example, the first through tenth embroidery patterns are relatively small sized embroidery patterns and the eleventh through fifteenth embroidery patterns are relatively large sized embroidery patterns.

Next, an embroidery pattern display routine for displaying embroidery patterns stored in the memory card 23A will be explained while referring to the flowchart in FIG. 11. It should be noted that S30 and S34 through S37 of the embroidery pattern display routine represented by the flowchart in FIG. 11 are same as S10 and S13 through S16 of the embroidery pattern display routine represented by the flowchart in FIG. 5.

When the memory card 23A is mounted (S30:YES), the table indication information is retrieved from the ROM 32 in S31.

The number of patterns table indicated by the retrieved table indication information is retrieved in S32. Then, in S33, lead addresses for the pattern display data are retrieved, starting from the top of the lead address table, in a number indicated by the number of patterns table retrieved in S32. The pattern display data stored at the retrieved lead addresses is retrieved and displayed on the display 20 in S34 and S35. For example, when the table indication information stored in ROM 32 reads "small device," indicating the small embroidery sewing device MS, then, the number of embroidery patterns "10" is retrieved from the small device number of patterns table in the memory card 23A. Therefore, starting from the top of the lead address table, ten lead addresses for pattern display data are retrieved from the memory card 23A. Then, the pattern display data stored at the retrieved lead addresses, that is, for the first through tenth embroidery patterns, is retrieved from the memory card 23A and, as shown in FIG. 8, the ten embroidery patterns sewable by the small embroidery sewing device MS are displayed on the display 20.

On the other hand, when the table indication information indicates "large device", then the number of embroidery patterns "15" is retrieved from the large device number of pattern table. Then, starting from the top of the lead address table, 15 lead addresses for pattern display data, that is, for the first through fifteenth embroidery patterns, is retrieved from the memory card 23A and displayed on the display 20 as shown in FIG. 9. In other words, 15 embroidery patterns sewable by a large embroidery sewing device ML are displayed on the display 20. With the above-described configuration, the same operations and effects of the first embodiment can be achieved.

In the same manner as the first embodiment, the configuration of the second embodiment can also be applied to an embroidery data processor not provided with a means for sewing embroidery.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiments and their modifications, which embroidery data is suitable for which type of embroidery sewing device is determined based on tables stored in the memory card. However, this configuration could be modified so that the size of each pattern is detected and automatically compared with the sewable area of a target embroidery sewing device. Only sewable patterns which can be contained within the sewable area of the target embroidery sewing device could then be automatically selected and displayed on the display. The user can then make a selection of which of the display patterns he or she wishes to edit. Also, only pattern display data for all the embroidery patterns need be stored in the embroidery sewing memory card 23, 23A. In this case, the embroidery data can be developed by developing the embroidery display data. Alternatively, only embroidery data need be stored in the memory card 23, 23A, in which case, embroidery display data could be developed from the embroidery data. Further, pattern data which can be developed into both embroidery data and pattern display data can be stored in the memory card 23, 23A and developed into pattern display data or embroidery data as needed.

Lead address tables for a plurality of embroidery sewing devices can be stored in the memory card 23 or number of pattern tables for a plurality of machines can be stored in the memory card 23A. The present invention can be applied to a variety of embroidery sewing memory cards, to a variety of embroidery sewing devices capable of sewing embroidery by producing relative movement between a needle 15 and a cloth support frame; to a variety of embroidery sewing devices capable of sewing embroidery by using a feed dog to move the workpiece cloth in the leftward, rightward, frontward, and backward directions; and to a variety of sewing data processors capable of displaying embroidery patterns without being provided with a embroidery sewing mechanism.

What is claimed is:

1. An embroidery sewing memory medium detachably mounted in a memory medium mounting portion of an embroidery sewing machine, the embroidery sewing machine having a display, the embroidery sewing memory medium comprising:

a first storage region storing sets of pattern data under corresponding lead addresses, each set of pattern data corresponding to an embroidery pattern that is sewable in at least one of a plurality of embroidery sewing machine types; and a second storage region storing data in table form indicating correspondence between the embroidery sewing machine types and the lead addresses of pattern data based on which pattern data is sewable in which embroidery sewing machine type, wherein embroidery patterns sewable in the at least one of the embroidery sewing machine types and corresponding to pattern data stored in the first storage region (a) are displayed on the at least one of the embroidery sewing machine types based on at least the data stored in table form in the second storage region and (b) other embroidery patterns not sewable in the at least one of the plurality of embroidery sewing machine types based on at least the data stored in table form in the second storage region are not displayed on the at least one of the embroidery sewing machine types.

2. An embroidery sewing memory medium as claimed in claim 1, wherein the second storage region stores a lead address table including at least:

a first lead address table for a first type of embroidery sewing machine and storing at least one lead address of at least one set of pattern data usable in the first type of embroidery sewing machine; and a second lead address table for a second type of embroidery sewing machine and storing at least one lead address of at least one set of pattern data usable in the second type of embroidery sewing machine.

3. An embroidery sewing memory medium as claimed in claim 1, wherein the second storage region includes:

a third storage region storing a lead address table including a plurality of lead address subtables each storing a lead address of a set of pattern data for sewing an embroidery pattern, the plurality of lead address subtables being stored in the lead address table in order of size of their corresponding embroidery patterns classified into at least a small pattern group and a large pattern group; and a fourth storage region storing a number of patterns table including at least:
  a number of small patterns table storing how many embroidery patterns are in the small pattern group; and
  a number of large patterns table storing how many embroidery patterns are in the large pattern group.

4. An embroidery sewing memory medium as claimed in claim 1 wherein the pattern data used for displaying the embroidery pattern includes pattern data used for sewing a corresponding embroidery pattern.

5. A method of storing embroidery data in an embroidery sewing memory medium detachably mountable in a memory medium mounting portion of an embroidery sewing machine and for displaying embroidery patterns, the method comprising the steps of:

a first step of storing sets of pattern data under corresponding lead addresses in a first storage region, each set of pattern data corresponding to an embroidery pattern that is sewable in at least one of a plurality of embroidery sewing machine types, and a second step of storing, in a second storage region, data in table form indicating correspondence between the embroidery sewing machine types and the lead addresses of pattern data based on which pattern data is sewable in which embroidery sewing machine type, and (a) displaying embroidery patterns sewable in the at least one of the embroidery sewing machine types and corresponding to pattern data stored in the first storage region on the at least one of the embroidery sewing machine types based on at least the data stored in table form in the second storage region and (b) not displaying other embroidery patterns not sewable in the at least one of the plurality of embroidery sewing machine types based on at least the data stored in table form in the second storage region on the at least one of the embroidery sewing machine types.

6. A method as claimed in claim 5, wherein in the second step, the data in table form is stored in a lead address table of the second storage region, the lead address table including at least:

a first lead address table for a first type of embroidery sewing machine and storing at least one lead address of at least one set of pattern data usable in the first type of embroidery sewing machine; and a second lead address table for a second type of embroidery sewing machine and storing at least one lead address of at least one set of pattern data usable in the second type of embroidery sewing machine.

7. A method as claimed in claim 5, wherein the second storage region includes a third storage region and a fourth storage region, wherein in the second step the data in table form is stored in the third storage region and the fourth storage region, wherein;

the third storage region stores a lead address table including a plurality of lead address subtables each storing a lead address of a set of pattern data for sewing an embroidery pattern, the plurality of lead address subtables being stored in the lead address table in order of size of their corresponding embroidery patterns classified into at least a small pattern group and a large pattern group; and the fourth storage region stores a number of patterns table including at least:
  a number of small patterns table storing how many embroidery patterns are in the small pattern group; and
  a number of large patterns table storing how many embroidery patterns are in the large pattern group.

8. An embroidery data processor comprising:

an embroidery sewing memory medium including:
  a first storage region storing sets of pattern data under corresponding lead addresses, each set of pattern data corresponding to an embroidery pattern that is sewable in at least one of a plurality of embroidery sewing machine types; and
  a second storage region storing data in table form indicating correspondence between the embroidery sewing machine types and the lead addresses of pattern data based on which pattern data is sewable in which embroidery sewing machine type, a memory medium mounting portion for detachably mounting the memory medium;

display means including a display and a controller; and pattern display control means for storing information indicating at least one of the plurality of sewing machine types applicable to the embroidery data processor and for displaying on the display means each embroidery pattern sewable in the indicated at least one sewing machine type and not displaying other embroidery patterns not sewable in the indicated at least one sewing machine type.

9. An embroidery data processor as claimed in claim 8, wherein the memory medium stores in its second storage region a lead address table including at least:
  a first lead address table for a first type of embroidery sewing machine and storing at least one lead address of at least one set of pattern data usable in the first type of embroidery sewing machine; and
  a second lead address table for a second type of embroidery sewing machine and storing at least one lead address of at least one set of pattern data usable in the second type of embroidery sewing machine; and wherein the pattern display control means indicates, from at least the first and second lead address tables in the lead address table stored in the second storage region of the embroidery sewing memory medium, each lead address table for a type of embroidery sewing device usable with the embroidery data processor and displays on the display means an embroidery pattern of each set of embroidery data stored at each lead address indicated by the lead address table.

10. An embroidery data processor as claimed in claim 9, further comprising an embroidery sewing means including:
  a sewing mechanism for mounting a needle;
  a cloth support frame for supporting a workpiece cloth; and a workpiece cloth feeding means for driving relative movement between the cloth support frame and the sewing mechanism; and wherein:

the information stored in the pattern display control means indicates which of the plurality of sewing machine types correspond to the embroidery sewing means.

11. An embroidery data processor as claimed in claim 8, wherein the second storage region includes:

a third storage region storing a lead address table including a plurality of lead address subtables each storing a lead address of a set of pattern data for sewing an embroidery pattern, the plurality of lead address subtables being stored in the lead address table in order of size of their corresponding embroidery patterns classified into at least a small pattern group and a large pattern group; and a fourth storage region storing a number of patterns table including at least:
  a number of small patterns table storing how many embroidery patterns are in the small pattern group; and
  a number of large patterns table storing how many embroidery patterns are in the large pattern group;

and wherein the pattern display control means stores:

table indication information for indicating, from at least the number of small patterns table and the number of large patterns table in the number of patterns table stored in the fourth storage region of the embroidery sewing memory medium, a table corresponding to a type of embroidery sewing device applicable to the embroidery data processor; and a program for retrieving lead addresses, based on a number stored in the table indicated by the table indication information, starting from a first lead address in the embroidery pattern memory medium.

12. An embroidery data processor as claimed in claim 11, further comprising an embroidery sewing means including:

a sewing mechanism for mounting a needle;

a cloth support frame for supporting a workpiece cloth; and a workpiece cloth feeding means for driving relative movement between the cloth support frame and the sewing mechanism; and wherein:

the information stored in the pattern display control means indicates which of the plurality of sewing machine types correspond to the embroidery sewing means.

13. An embroidery data processor as claimed in claim 8, further comprising an embroidery sewing means including:

a sewing mechanism for mounting a needle;

a cloth support frame for supporting a workpiece cloth; and a workpiece cloth feeding means for driving relative movement between the cloth support frame and the sewing mechanism; and wherein:

the information stored in the pattern display control means indicates which of the plurality of sewing machine types correspond to the embroidery sewing means.

14. An embroidery sewing memory medium detachably mounted in a memory medium mounting portion of an embroidery sewing machine, the embroidery sewing memory medium comprising:

a first storage region that stores sets of pattern data under corresponding lead addresses, each set of pattern data corresponding to an embroidery pattern that is sewable in at least one of a plurality of embroidery sewing machine types, wherein some of the embroidery patterns that correspond to the pattern data stored in the first region (a) are sewable in at least one of the plurality of embroidery sewing machine types and (b) are not sewable in other of the plurality of embroidery sewing machine types; and a second storage region that stores data in table form indicating correspondence between the embroidery sewing machine type and the lead addresses of pattern data based on which pattern data is sewable in which embroidery sewing machine type.

* * * * *